United States Patent [19]
Sorden

[11] Patent Number: 6,107,939
[45] Date of Patent: Aug. 22, 2000

[54] LANE CHANGE ALARM FOR USE IN A HIGHWAY VEHICLE

[75] Inventor: James L. Sorden, Saratoga, Calif.

[73] Assignee: Trimble Navigation Limited, Sunnyvale, Calif.

[21] Appl. No.: 09/186,473

[22] Filed: Nov. 5, 1998

[51] Int. Cl.[7] .................................................... G08G 1/00
[52] U.S. Cl. ...................... 340/901; 340/439; 340/905; 340/988; 701/205
[58] Field of Search ................................. 340/439, 438, 340/901, 904, 905, 988, 995, 989; 701/300, 200, 205, 207, 208, 213, 214; 342/457

[56] References Cited

U.S. PATENT DOCUMENTS

| | | | |
|---|---|---|---|
| 4,530,056 | 7/1985 | MacKinnon et al. | 342/424 |
| 4,591,823 | 5/1986 | Horvat | 340/905 |
| 4,663,629 | 5/1987 | Tagami et al. | 340/995 |
| 5,146,219 | 9/1992 | Zechnall | 340/905 |
| 5,369,591 | 11/1994 | Broxmeyer | 364/461 |
| 5,621,646 | 4/1997 | Enge et al. | 364/449 |
| 5,717,593 | 2/1998 | Gvili | 364/449.1 |
| 5,760,713 | 6/1998 | Yokoyama et al. | 340/905 |
| 5,774,070 | 6/1998 | Rendon | 340/905 |
| 5,877,707 | 3/1999 | Kowalick | 340/439 |

OTHER PUBLICATIONS

GPS World magazine, pp. 44–50, "Between the Lines: A Driver–Assistive Technology for Staying in the Lane" by Vassilios, Morris, Alexander, and Donath, May 1998, published by Advanstar Communications of Duluth, Minnesota.

*Primary Examiner*—Brent A. Swarthout
*Attorney, Agent, or Firm*—David R. Gildea

[57] ABSTRACT

A lane change alarm using data for a highway track. A highway track database provides geographical location points for a track of a highway lane. A differential global positioning system (DGPS) receiver provides a vehicle location. A longitudinal track matching code matches the vehicle location against a track location and provides a longitudinal direction and a transverse distance to an alarm gate. The alarm gate indicates an alarm condition unless a lane change signaler is operated for indicating that the lane change is intentional. The highway track database is created using a similar DGPS receiver by determining and recording highway track location points for a selected highway lane while driving on the highway lane.

25 Claims, 3 Drawing Sheets

LANE CHANGE ALARM FOR USE IN A HIGHWAY VEHICLE

BACKGROUND OF THE INVENTION

1. Field of the Invention

The invention relates generally to vehicle navigation and more particularly to a system for warning a driver when he or she is inadvertently changing lanes on a highway.

2. Description of the Prior Art

Many thousands of people are killed every year on highways as a result of a driver falling asleep at the wheel. With the driver asleep the vehicle drifts across lane boundaries creating an accident that often kills the driver, his passengers and sometimes people in other vehicles. Long distance truckers driving many hours in succession at night and others traveling great distances with little rest on rural freeways are especially at risk.

Several developments and proposals have been made for automatic guidance of vehicles along highway lanes that could potentially solve the problem of inadvertent lane changes due to falling asleep at the wheel. Most such systems use wires or magnets that are buried in the highway or have radio transmitters at very frequent intervals for triangulation. Unfortunately, the cost of the infrastructure for these systems has made large scale implementation unlikely or, at best, slow. Other systems have been developed or proposed using laser or sonar distance measurements to detect a vehicle ahead for use in avoiding rear end collisions. However, the laser and sonar measurements are not as well suited for detecting transverse motion such as an inadvertent lane change when no other object is adjacent.

Recently, improvements in differential global position systems (DGPS) have enabled DGPS receivers to obtain reliable near instantaneous sub-meter location accuracies with respect to a reference location. Conceivably, one could construct a conventional digital map database having highways mapped to sub-meter accuracy and then use the map database and conventional navigation techniques with a DGPS receiver in a vehicle for observing the vehicle position with respect to the highway. However, conventional map databases having such accuracy are time consuming and expensive to construct, and have very little other utility since sub-meter accuracy is not needed for normal highway navigation. There is a need for an inexpensive lane change alarm for warning a driver of an inadvertent lane change that does not require a new expensive highway infrastructure or a conventional precision map database.

SUMMARY OF THE INVENTION

It is therefore an object of the present invention to provide an inexpensive lane change alarm for comparing a vehicle location to a track of a lane of a highway and issuing an alarm when the vehicle begins to make an inadvertent lane change.

Another object of the present invention is to provide a database having location data for a track of a lane of a highway by recording location data for a reference vehicle being driven on the highway.

Briefly, in a preferred embodiment, the lane change alarm includes highway track database, a precision location device such as a differential global positioning system (DGPS) receiver for determining a vehicle location, a transverse error detector for determining a transverse distance error of the vehicle location with respect to the track, and at least one alarm device for warning a driver when the transverse distance error indicates a lane change. The highway track database includes geographical location points along a track of a highway lane. A longitudinal track matching code matches the vehicle location to the track for determining a proximate location longitudinal along the track and providing the longitudinal track location to the transverse error detector. An alarm gate generates an alarm condition indication when the transverse distance exceeds a threshold, thereby indicating a lane change is occurring. The alarm condition indication is issued to one or more alarm devices for generating the warning to the driver of the vehicle. The alarm gate is coupled to a vehicle lane change signaler for enabling the driver to inhibit the alarm condition indication when the lane change is intentional. The threshold may be adjustable in order to tune the alarm gate to the best fit for avoiding false alarms and not missing a true alarm condition. Two or more warning levels may be issued depending upon the amount that the transverse distance exceeds the threshold. For example, for a slight deviation from the track, the alarm device issues a warning light or a soft audible signal and for a major deviation the alarm device issues a loud signal that would awaken almost any driver who has fallen asleep. Additionally, the alarm device may be augmented with a two-way radio or cellular telephone for transmitting the alarm condition to a dispatcher or other interested party who may respond by communicating with the driver. A key to the present invention is the coupling of a highway track location database, means for determining whether a vehicle is being driven within reasonable lane boundaries, and a driver invoked lane change signaler for inhibiting the lane change alarm condition when a lane change is intentional. The highway track database is created using a similar precision location device by determining and recording highway track location points for a selected highway lane while driving on the highway lane.

An advantage of the lane change alarm of the present invention is that neither an expensive infrastructure nor a precision map database is required for warning a driver of a vehicle of an inadvertent lane change.

Another advantage of the lane change alarm present invention is that an accurate highway track database is simple and economical to create by recording locations while driving in a lane on a highway.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
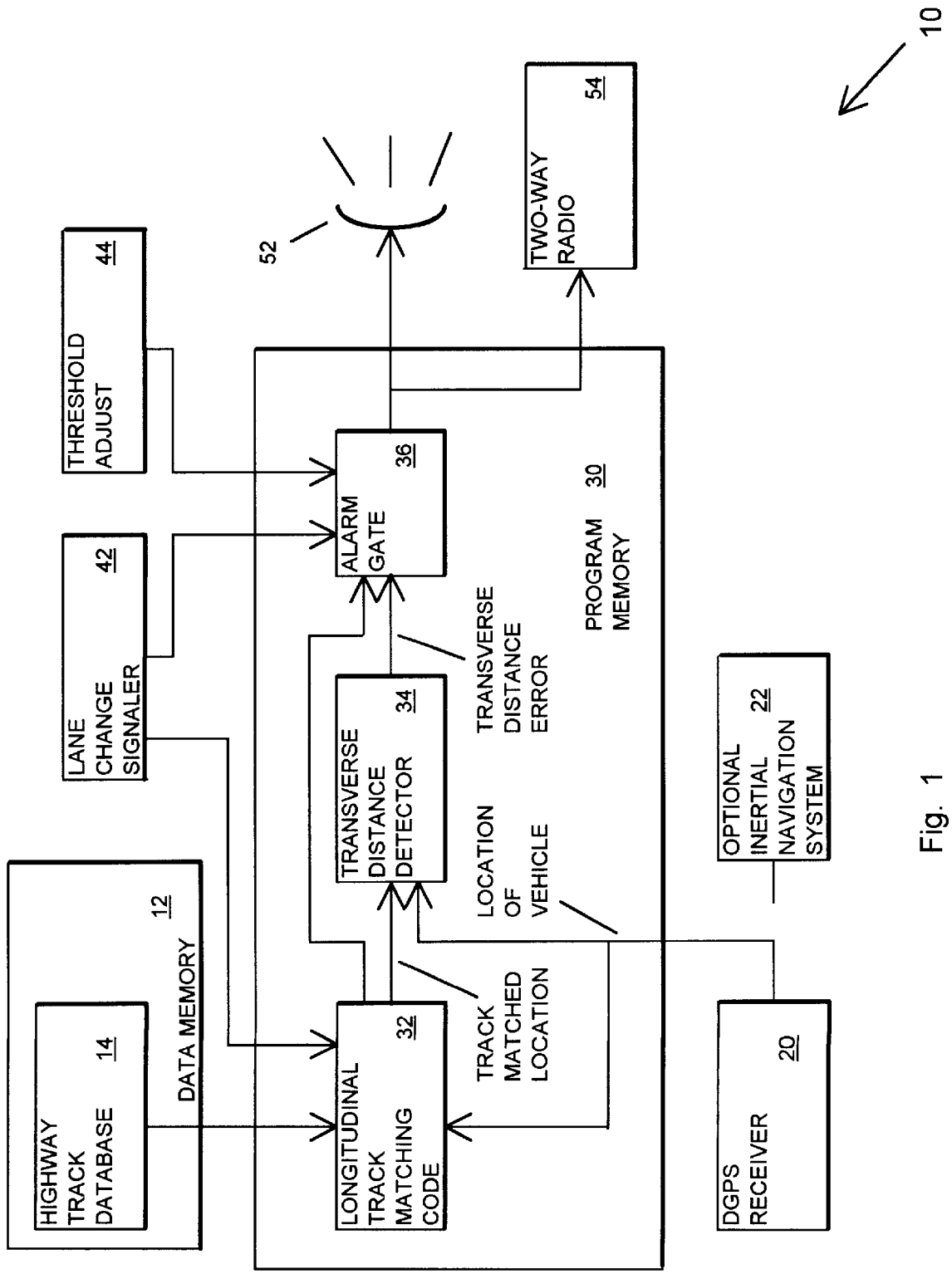
FIG. 1 is a functional block diagram of a lane change alarm of the present invention.

FIG. 1 is a functional block diagram of a lane change alarm of the present invention referred to by the general reference number 10 for use in a highway vehicle. The lane change alarm 10 includes a data memory 12 including a highway track database 14 and a location determination device such as a differential global positioning system (DGPS) receiver 20 for determining a geographical location of the vehicle while the vehicle is being driven on a highway. Preferably, the location determination device is the differential global positioning system (DGPS) receiver 20, however, other precision location determination devices such as an inertial navigation system (INS) 22, a global orbiting navigational system (GLONASS) receiver, and the like could be used. The highway track database 14 stores data for geographical location points for a track nominally centered along a lane, preferably the right most lane, of a highway, and lane numbers and widths for each lane in the highway at that track location point. The lane numbers and lane widths seldom change and so require very little memory space. A conventional road map database for an area and the highway track database 14 are similar in that both have two-dimensional coordinates for location data. However, unlike the conventional road map database that includes area-wide location data coordinates, the highway track database 14 need include only location data coordinates that are in the one-dimension along the track.

Figure 2:
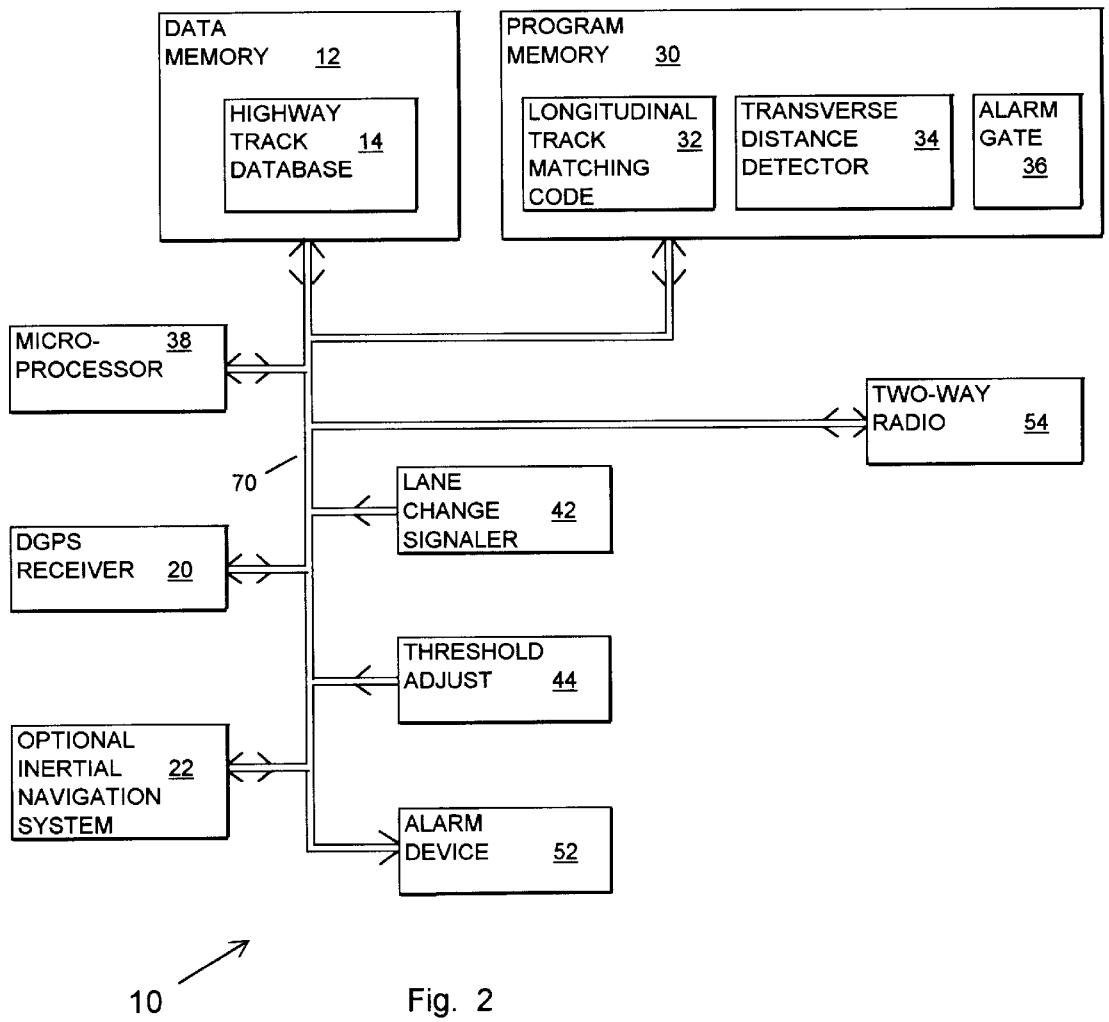
FIG. 2 is a structural block diagram of the lane change alarm of FIG. 1.

The lane change alarm 10 includes a program memory 30 including a longitudinal track matching code 32, a transverse error detector 34, and an alarm gate 36 having coded instructions that are executed by a microprocessor 38 (FIG. 2). The DGPS receiver 20 passes information for the geographical vehicle location to the longitudinal matching code 32 and the transverse error detector 34. The longitudinal track matching code 32 uses the vehicle location for selecting the geographical track locations from the highway track database 14 that are proximate to the current vehicle location and uses the proximate track locations for determining a longitudinal direction of the track in the current vicinity of the vehicle. In order to reduce the size of the data memory 12, the track location points stored in the highway track database 14 may be spaced apart by a significant distance depending upon the straightness of the highway. The longitudinal track matching code 32 uses the longitudinal direction for interpolating between the spaced apart track location points for determining the geographical location along the track that is closest to the vehicle location. The longitudinal track matching code 32 then determines a transverse offset between the vehicle location and the closest location along (longitudinal to) the track and uses information for the transverse offset with information for the lane numbers and lane widths from the highway track database 14 for determining the lane in which the vehicle is driving. A track matched location is determined as the location along the track in the driving lane that is closest to the vehicle location. Information for the track matched location and the longitudinal direction of the track is passed to the transverse error detector 34 and information for the lane width associated with the track match location is passed to the alarm gate 36. The transverse error detector 34 compares the track matched location to the actual vehicle location and determines a transverse distance error between the track matched location and the vehicle location. The amount of the transverse distance error is passed as multi-level information to the alarm gate 36.

A lane change signaler 42, such as a vehicle turn signal of a type that is commonly mounted on a steering column, is operated by the driver of the vehicle when the driver intends to change lanes. When operated, the lane change signaler 42 issues a responsive intentional lane change signal to the alarm gate 36 for indicating that a change of lane is intentional. When the intentional lane change signal is being received, the alarm gate 36 ignores the transverse distance error. A right or left indication from the lane change signaler 42 informs the longitudinal track matching code 32 to change lane numbers. When the intentional lane change signal is not being received, the alarm gate 36 compares the transverse distance error to a multi-level threshold received from a threshold adjuster 44 preferably under control of the driver. The driver decreases the level of the threshold in order to increase the sensitivity of the alarm gate 36 to the transverse distance error and increases the level of the threshold in order to decrease the sensitivity of the alarm gate 36. When the transverse distance error exceeds the threshold, the alarm gate 36 issues a multi-level alarm condition. The level of the alarm condition indicates the amount, scaled by lane width information from the longitudinal track matching code 32, by which the transverse distance error exceeds the threshold. The multi-level alarm condition is converted to an alarm signal and passed to at least one alarm device 52. Alternatively, the alarm gate 36 responds to a rapid change in transverse distance error that exceed a rate of change threshold from the threshold adjuster 44.

The alarm device 52 preferably includes a speaker or a buzzer, however, a visual display, a tactile connection to the driver, or a combination of several devices may be used. A variable amplitude alarm signal and/or separate alarm signals are issued to the alarm device 52 or devices for generating a low level or gentle warning when the transverse distance error exceeds the threshold by a small amount indicating that the vehicle is or is moving slightly off course or generating an urgent or strident wake-up alarm when the transverse distance error exceeds the threshold by a large amount indicating that the vehicle moving rapidly off course, or is crossing or has crossed a lane boundary. The alarm device 52 may be augmented by a two-way radio 54 for communication with a dispatcher or other interested party who may wish to communicate with the driver to determine whether a problem exists and perhaps aid the driver in increasing his alertness by talking to him. The two-way radio 54 may be a cellular telephone.

The DGPS receiver 20 is used with a DGPS reference system. The DGPS reference system preferably uses a network of reference stations and a master station. Each reference station receives GPS signals from GPS satellites it observes and computes in response a pseudo-range residual for each GPS satellite it observes. The master station is in communication with the reference stations to receive the computed pseudo-range residuals and comprises a pseudo-range residual synchronizer, an ephemeris and clock correction estimator for each GPS satellite observed by the reference stations, and a transmitter. The pseudo-range residual synchronizer is responsive to the received pseudo-range residuals in order to compute clock differences between the reference stations and remove the clock differences from the received pseudo-range residuals so as to synchronize them. Each ephemeris and clock correction estimator computes an ephemeris correction and a clock correction for the corresponding GPS satellite in response to each synchronized pseudo-range residual for the corresponding GPS satellite. The master station transmitter transmits to the DGPS receiver 20 the computer ephemeris and clock corrections for each GPS satellite observed by the reference station. The DGPS receiver 20 includes a radio receiver for receiving the transmission. Such DGPS system is disclosed by Enge et al. in U.S. Pat. No. 5,621,646 incorporated herein by reference. Sub-meter DGPS systems are commercially available as series 4000 DGPS Receivers from Trimble Navigation Limited of Sunnyvale, Calif. The 4000 DGPS receivers include Trimble 4000RS Reference Surveyor and Trimble 4000DS Differential Surveyor receivers that provide real-time sub-meter positioning based on L1 C/A code using an RTCM SC-104 standard. Differential GPS information is broadcast from RDF stations operated by the United States Coast Guard and government agencies in other countries. Several other sources of DGPS information are available including FM radio stations around the world that broadcast differential GPS information using an RDS-type format and geosynchronous communication satellites.

The inertial navigation system 22 can be used for providing the vehicle location when the GPS signal is blocked and/or for smoothing the DGPS-based vehicle location. The inertial navigation system 22 can be constructed of an odometer connection and two or three single axis rate-of-rotation detectors (gyros). Such gyros are commercially available at low cost as a model HFOG-CLA-DT from Hitachi Cable Limited of Chiyoda-Ku, Tokyo, Japan; a model RD1000 from KVH Industries, Inc. of Middletown, R.I.; a model QR514-64-109 from Systron Donner Inertial Division of Concord, Calif.; and a model ENV-05H-02 from Murata Erie North America, Inc. of Smyrna, Ga. Alternatively, the inertial navigation system 22 may be used as a primary location determination device with occasional corrections from the DGPS receiver 20 or other location determination device or by a user entering a known vehicle location.

FIG. 2 is a block diagram showing the structural elements of the lane change alarm 10. The lane change alarm 10 includes the microprocessor 38 for operating over a circuit bus 70 according the instructions stored in executable form in the program memory 30 and for writing and reading data in the data memory 12 in a conventional manner. The program memory 30 includes program codes for the longitudinal track matching code 32, the transverse error detector 34, and the alarm gate 36; and the data memory 12 includes the highway track database 14 as described above. The two-way radio 54, the DGPS receiver 20, the optional inertial navigation system 22, and/or other location determination devices are interfaced to the circuit bus 70 in a conventional manner with interface circuitry. The alarm device 52 or devices include one or more drivers for connection to the circuit bus 70. The microprocessor 38 may be connected with the circuit bus 70 throughout the vehicle, and the data memory 12 and program memory 30 may be integrated with other memory used in the vehicle for controlling and receiving information from the engine, dashboard readouts, and so on within the vehicle.

Figure 3:
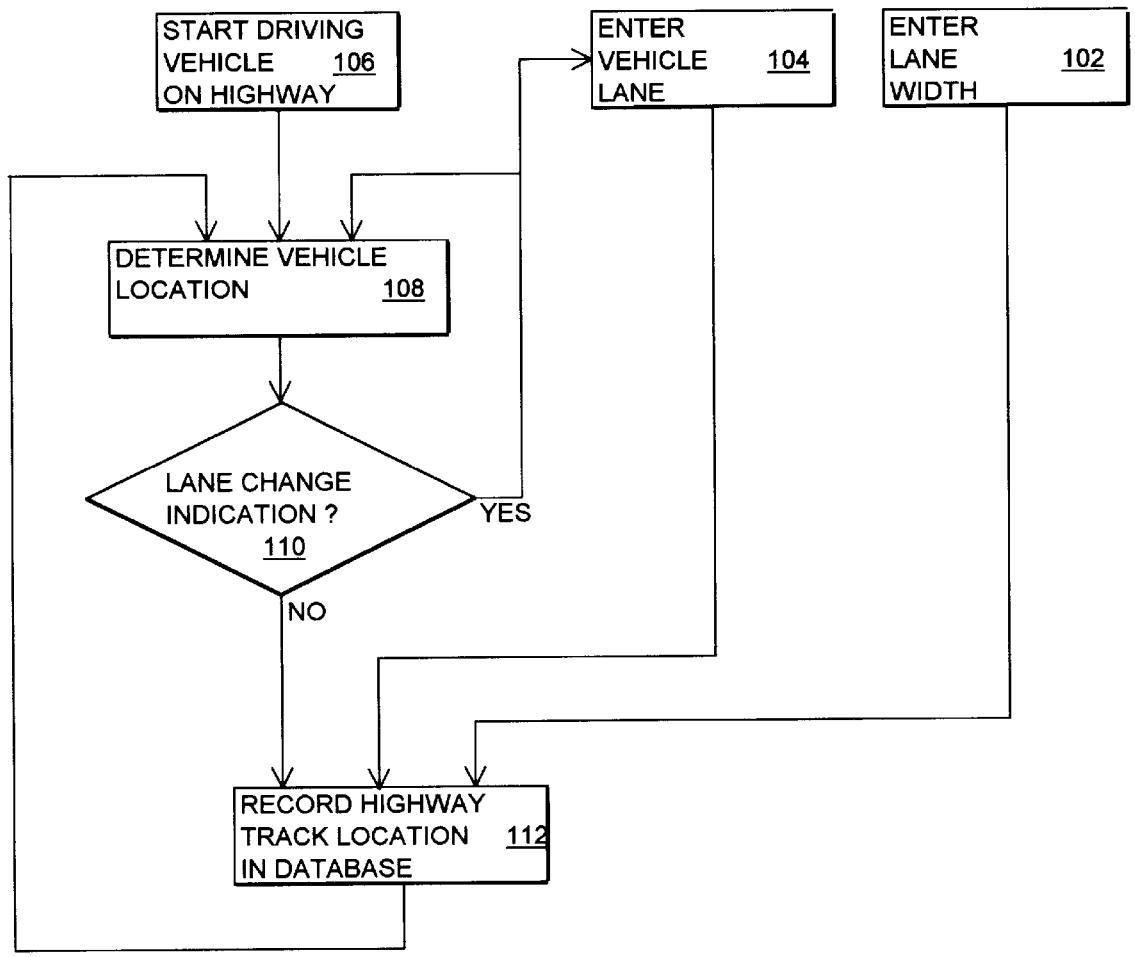
FIG. 3 is a flow chart showing a method for creating a highway track database for the lane change alarm of FIGS. 1 and 2.

FIG. 3 is a flow chart of a method for creating the highway track database 14. Of course, the highway track database 14 could be created using conventional surveying and mapping techniques. However, such techniques are time consuming and expensive and result in much more data than is needed. At the start, a highway vehicle is outfitted with a lane changing indicator that is operable by the driver of the vehicle and a location determination device such as the differential global positioning system (DGPS) receiver 20 interfaced to a computer having an executable program code and data memory for creating the highway track database 14. The vehicle is driven on the highway for which highway track data is to be created. In a step 102 lane numbers and widths for each lane are entered into the highway track database 14 (FIGS. 1 and 2). In a step 104 the driver enters the lane number in which he is driving with a default to the right lane into the highway track database 14. In a step 106 the vehicle starts driving on the highway. In a step 108 the DGPS receiver 20 determines a vehicle location. In a step 110 the computer determines when the lane changing indicator indicates that the lane is being changed. In a step 112, when the lane change indication is absent, the computer records the vehicle location in the highway track database 14 in association with the lane number and the lane width and loops back to the step 108 for determining the next track location. When the lane change indication is present the step 112 enters a wait state until the lane change indication is no longer present and then loops back to the step 108. Either the lane change indication includes information for right or left or a new lane number is entered in the step 104 in order to change the lane number in the highway track database 14 that is associated with the next vehicle locations. The step 102 may need to be repeated in order to enter new lane numbers and lane widths due to changes in the highway.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An apparatus for use in a vehicle being driven on a highway for detecting an inadvertent lane change, comprising:

a locator for determining a vehicle location for said vehicle;

a highway track database having location data for a track of a lane of said highway;

a transverse error detector coupled to the locator and the database for determining a transverse distance error between said vehicle location and a location along said track closest to said vehicle location;

and an alarm gate coupled to the transverse error detector for issuing an alarm condition indication when said transverse distance error exceeds a threshold.

2. The apparatus of claim 1, further comprising:

a lane change signaler for receiving an operation for indicating when a lane change is intended and issuing a responsive intentional lane change signal for causing the alarm gate to ignore said transverse distance error when said lane chance signal is received, whereby said alarm condition indication is not issued when said lane chance is intended.

3. The apparatus of claim 1, wherein:

the alarm gate is further for issuing a first said alarm condition indication when said transverse distance error exceeds said threshold by a first distance and a second said alarm condition indication when said transverse distance error exceeds said threshold by a second distance, said second distance greater than said first distance.

4. The apparatus of claim 3, further comprising:

at least one alarm device coupled to the alarm gate for generating a first alarm signal in response to said first alarm condition indication and a second alarm signal in response to said second alarm condition indication, said second alarm signal more perceptible than said first alarm signal.

5. The apparatus of claim 4, wherein:

said first alarm signal is at least one of (i) visually, (ii) audibly, and (iii) mechanically perceptible by a human user and said second alarm signal is at least one of (i) visually, (ii) audibly, and (iii) mechanically perceptible by a human user.

6. The apparatus of claim 1, further comprising:

a signal transmitter coupled to the alarm gate for transmitting an airwave alarm signal in response to said alarm condition indication.

7. The apparatus of claim 6, further comprising:

a signal receiver for receiving an airwave communication signal in response to said airwave alarm signal, said airwave communication signal including voice communication for aiding a driver of said vehicle in increasing alertness of said driver;

a speaker for issuing said voice communication.

8. The apparatus of claim 1, further comprising:

an alarm gate coupled to the transverse error detector and a lane change signaler, said lane change signaler for issuing an intentional lane change signal when operated for indicating an intentional lane change, for issuing an alarm condition indication when a rate of change of said transverse distance error exceeds a rate of change threshold in the absence of said intentional lane change indication.

9. The apparatus of claim 1, wherein:

the locator includes a differential global positioning (DGPS) receiver.

10. The apparatus of claim 1, wherein:

the locator includes an inertial navigation system.

11. The apparatus of claim 1, wherein:

the highway track database is constructed by determining track locations for a reference vehicle while driving said reference vehicle on said highway lane.

12. The apparatus of claim 11, wherein:

said track locations are determined with a differential global positioning (DGPS) receiver.

13. A method for use in a vehicle while driving on a highway for detecting a lane change, comprising steps of:

determining a vehicle location of said vehicle;

determining a track location proximate to said vehicle location from a highway track database having location data for a track of a lane of said highway;

determining a transverse distance error between said vehicle location and a location along said track closest to said vehicle location; and issuing an alarm condition indication when said transverse distance error exceeds a threshold.

14. The method of claim 13, further comprising a step of:

determining when a lane change signaler indicates an intentional lane change; and wherein:

the step of issuing an alarm condition includes ignoring said transverse distance error; when said intentional lane change is indicated, whereby said alarm condition indication is not issued when said lane change is intentional.

15. The method of claim 13, wherein:

the step of issuing said alarm condition indication includes issuing a first said alarm condition indication when said transverse distance error exceeds said threshold by a first distance and a second said alarm condition when said transverse distance error exceeds said threshold by a second distance, said second distance greater than said first distance.

16. The method of claim 15, further comprising a step of:

generating a first alarm signal in response to said first alarm condition indication and a second alarm signal in response to said second alarm condition indication, said second alarm signal more perceptible than said first alarm signal.

17. The method of claim 16, wherein:

said first alarm signal is at least one of (i) visually, (ii) audibly, and (iii) mechanically perceptible by a human user and said second alarm signal is at least one of (i) visually, (ii) audibly, and (iii) mechanically perceptible by a human user.

18. The method of claim 13, further comprising a step of:

transmitting an outgoing radio signal in response to said alarm condition indication.

19. The method of claim 18, further comprising a step of:

receiving an incoming radio signal in response to said outgoing radio signal, said incoming radio signal including voice communication for aiding a driver of said vehicle in increasing alertness of said driver;

issuing said voice communications from a speaker.

20. The method of claim 13, further comprising steps of:

determining when a lane change signaler indicates an intentional lane change; and issuing an alarm condition indication when a rate of change of said transverse distance error exceeds a rate of change threshold in the absence of said intentional lane change indication.

21. The method of claim 13, wherein:

step of determining a vehicle location of said vehicle includes determining said vehicle location with a differential global positioning (DGPS) receiver.

22. The method of claim 13, wherein:

step of determining a vehicle location of said vehicle includes determining said vehicle location with an inertial navigation system.

23. The method of claim 13, further comprising a step of:

constructing said highway track database by steps of: driving a reference vehicle on said highway; determining reference vehicle locations of said vehicle; and recording said reference vehicle locations as said location data for said track of said lane of said highway.

24. The method of claim 23, further comprising a step of:

said step of determining said reference vehicle locations includes determining said reference vehicle locations with a differential global positioning (DGPS) receiver.

25. A method of creating a highway track database having location data for a track of a lane of a highway, comprising steps of:

entering a lane number;

entering a lane width associated with said lane number;

driving a reference vehicle on said highway;

determining a reference vehicle location of said reference vehicle;

monitoring a change lane indicator for indicating a lane change;

when said lane change is not being indicated, recoding said reference vehicle location while driving said reference vehicle for said location data for said track of said lane of said highway in said highway track database; and associating said location data with said lane number and said width in said highway track database.

\* \* \* \* \*